United States Patent [19]

Oelke

[11] 4,394,020
[45] Jul. 19, 1983

[54] HIGH-SPEED SEAL

[75] Inventor: Erwin S. Oelke, Cypress, Calif.

[73] Assignee: Smith International, Inc., Newport Beach, Calif.

[21] Appl. No.: 434,996

[22] Filed: Oct. 18, 1982

[51] Int. Cl.³ .................. F16J 15/34; F16C 33/78; E21B 10/08
[52] U.S. Cl. .................................................. 277/1
[58] Field of Search ............... 277/1, 92, 95, 83, 84; 305/11; 308/8.2

[56] References Cited

U.S. PATENT DOCUMENTS

| | | | |
|---|---|---|---|
| 2,599,034 | 6/1952 | Wilkinson | 277/92 X |
| 2,881,015 | 4/1959 | Wahl | 277/1 X |
| 3,022,081 | 2/1962 | Kosatka | 277/84 X |
| 3,381,968 | 5/1968 | Neilson | 277/95 |
| 3,489,421 | 1/1970 | Neilson | 277/95 |
| 3,862,702 | 1/1975 | Millsap | 277/92 |
| 3,944,306 | 3/1976 | Neilson | 308/8.2 |
| 4,253,674 | 3/1981 | Fee | 305/11 |
| 4,337,951 | 7/1982 | Perego | 277/83 |
| 4,344,629 | 8/1982 | Oelke | 277/1 |

Primary Examiner—Robert I. Smith
Attorney, Agent, or Firm—Robert G. Upton

[57] ABSTRACT

The high-speed seal is a two-part metal-to-metal type seal that, in its initial application, acts as a conventional resilient O-ring. As the seal begins to operate, a separate O-ring, retained within a seal gland channel formed in the body of a primary metal seal, provides an initial seal. As the seal continues to function over a length of time, the separate O-ring retained within the seal gland in the ring wears away and metal-to-metal contact begins to be made. Thus, the seal gradually converts from a standard O-ring type of seal to a lapped-in metal-to-metal seal during operation of the bit.

12 Claims, 2 Drawing Figures

HIGH-SPEED SEAL

CROSS-REFERENCE TO RELATED APPLICATION

This application is related to Ser. No. 196,990, filed Apr. 28, 1980, U.S. Pat. No. 4,344,629, which is assigned to the same assignee as the present application.

BACKGROUND OF THE INVENTION

1. Field of the Invention

This invention relates to a high-speed seal for a rock bit.

More particularly, this invention relates to a high-speed metal-to-metal seal for a rock bit that initially acts as a conventional O-ring seal during the early running of the bit and, as the O-ring separating the metal-to-metal surfaces to be lapped gradually wears, the seal becomes a lapped metal-to-metal seal as the bit continues to run in a borehole.

2. Description of the Prior Art

There are many prior art patents that describe composite seals that are made up of resilient material that encapsulates or is adjacent to a metal sealing ring or the like. For example, U.S. Pat. No. 3,381,968, assigned to the same assignee as the present invention, describes and teaches one or more belleville type of rings encapsulated within a resilient sealing material with mating surfaces that contact both the leg of a rock bit surrounding a journal pin and a cone mounted on the journal pin. The belleville spring provides a means to accommodate for irregularities associated with the cone rotating on the journal pin. There is no metal-to-metal sealing contact as taught in the present invention.

The present invention initially functions as a resilient seal and progresses towards a metal-to-metal seal as the small O-ring housed within a channel formed in the metal ring wears away, allowing the metal portion of the seal to gradually seat into the bearing surface of the opposing cone or leg portion of a rock bit.

U.S. Pat. No. 3,761,145 describes a metal-to-metal seal with an oval-shaped O-ring positioned adjacent a metal sealing ring. The O-ring serves to urge the sealing ring into metal-to-metal contact with an adjacent cone of a rock bit. A portion of the journal supporting the cone nearest the bearing surface is conical in shape, thus biasing the oval-shaped O-ring against the metal-to-metal sealing ring. The O-ring forces the sealing surface of the ring into contact with the bearing surface of the cone. This patent, however, requires that the metal-to-metal seal must be lapped-in before the rock bit is operational. Otherwise, lubricant from within the bearing surfaces can escape by the sealing surfaces before the metal-to-metal surfaces are adequately seated. Once lubricant escapes from bearing surfaces of a rock bit, the operating life of the rock bit is considerably shortened. The bearings easily become overheated and will catastrophically fail due to lack of lubricant in the bearing.

The present invention substantially eliminates any tendency to lose lubricating grease from within a roller cone. Upon initial actuation or operation of the bit, the seal acts as an ordinary resilient O-ring and, as the cone continues to rotate on its journal, the separate O-ring housed within the channel formed in the metal ring gradually wears away, thereby allowing the metal sealing face of the seal to slowly but surely lap into sealing engagement with adjacent sealing surfaces on a cone or a journal of a rock bit. Thus, little or no lubricant can escape past the seal due to the fact that the separate O-ring portion of the seal prevents this from happening.

SUMMARY OF THE INVENTION

An object of this invention is to provide a metal-to-metal seal that prevents egress of lubricant from within a rock bit while the metal-to-metal surfaces gradually become lapped into sealing engagement during operation of the rock bit.

Still another object of the invention is the elimination of the need for expensive and time-consuming pre-lapped metal-to-metal surfaces necessary with metal-to-metal seals where there is no initial protection from lubricant leakage, such as that taught in the instant invention.

A seal apparatus for a rock bit is disclosed. The seal is positioned in a cavity formed between a leg of a rock bit, the leg having a journal extending therefrom, and a rotatable cone mounted on the journal. The seal consists of a metal ring. The ring has a diameter that will fit within the cavity. A peripheral surface formed by the ring subsequently serves as part of a metal-to-metal seal.

A resilient material partially encapsulates the metal ring. The resilient material forms an O-ring type of seal that contacts a portion of the cavity formed between the leg of the rock bit and the rotatable cone during initial rotation of the cone on the journal. A separate O-ring is positioned within a seal gland formed in the peripheral surface of the metal ring. A portion of the O-ring retained in the seal gland in the metal peripheral surface eventually wears away, exposing the peripheral metal surface to an adjacent metal cavity wall. The metal surface and the cavity wall subsequently form a lapped sealing surface. The separate O-ring of the seal prevents loss of a lubricant stored within the rock bit during the time the peripheral surface of the metal ring is forming a lapped seal against the adjacent wall of the cavity.

An advantage over the prior art is the ability to protect a rock bit from lubricant leakage while lapping in adjacent metal-to-metal sealing surfaces.

Another advantage over the prior art is the use of a larger or smaller separate O-ring housed within a channel formed in the to-be-lapped metal ring to control the ring lapping sequence.

Yet another advantage over the prior art is the use of separate O-rings with harder or softer durometer hardness to control the ring lapping sequence.

Still another advantage of the present invention over the prior art is the use of a material other than a resilient O-ring, such as plastic, to protect the rock bit bearing while the metal-to-metal surface laps in during operation of the bit.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
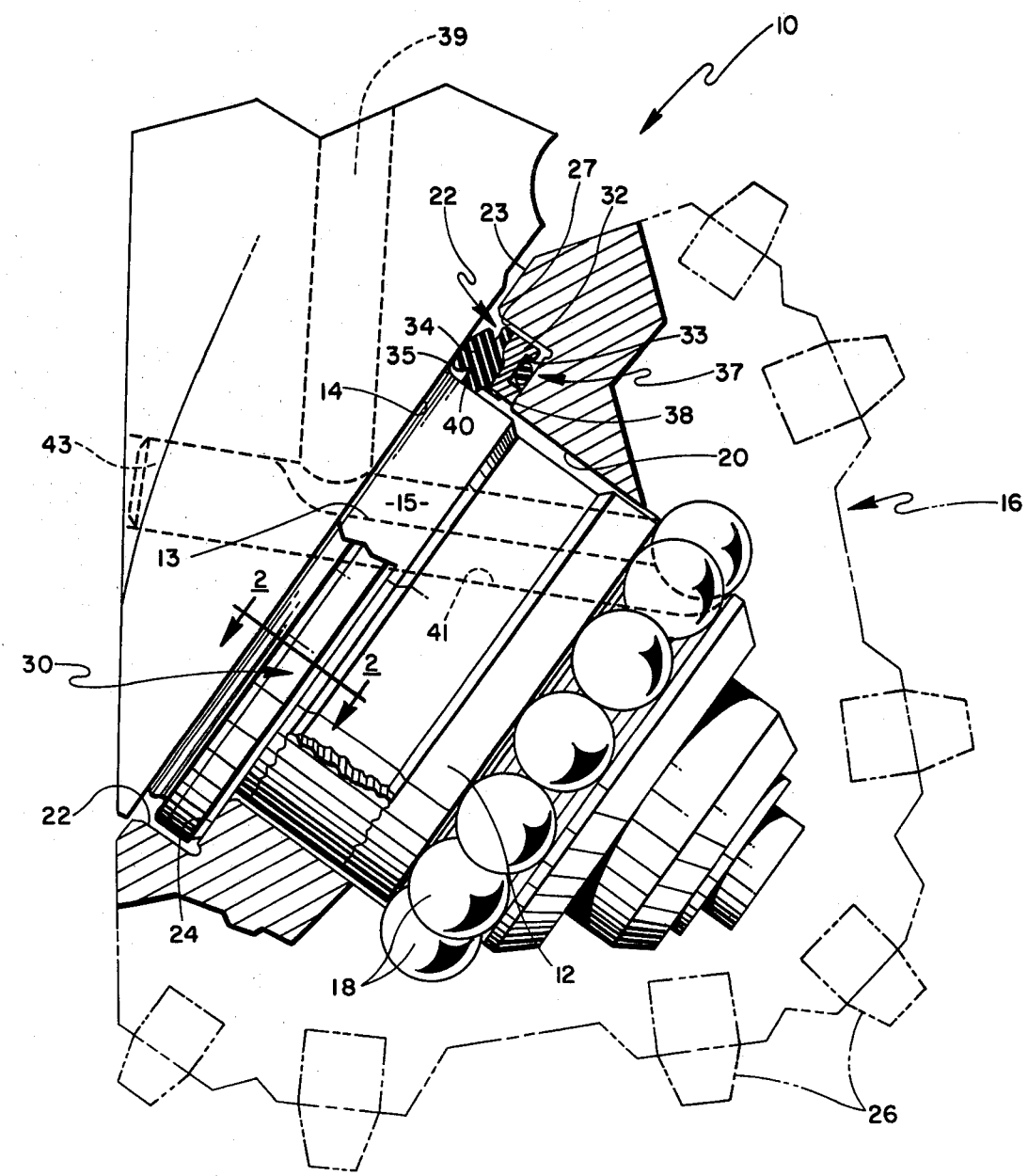
FIG. 1 is a partially broken away, partially in phantom line, cross section of the preferred embodiment of the invention.

Turning now to FIG. 1, a leg, generally designated as 10, of a typical multi-cone sealed bearing rock bit has a journal bearing 12 extending therefrom. At the base 13 of the journal 12 is a leg backface 14 machined into leg 10. A cone cutter 16 with, for example, multiple inserts 26 interference fitted therein, mounts onto the journal 12. The cone is retained by a multiplicity of thrust balls 18.

A seal cavity or recess 22 is preferably formed in the cone backface 23. A radially aligned bearing surface 24 is machined in the seal cavity 22.

A high-speed seal, generally designated as 30, consists of a first outer resilient material 34 fabricated from, for example, a nitrile compound. An example of this compound (and a preferred resilient material for the high-speed seal 30) is Gardena Rubber Compound 716-70, manufactured by Gardena Rubber Company, Inc., Gardena, Calif. This rubberlike material substantially encapsulates a metal ring 32. A peripheral sealing surface 38, defined by the ring 32, is substantially exposed to bearing surface 24 in seal cavity 22. Ring 32 additionally defines an annular seal gland cavity 33. An O-ring, generally designated as 37, for example, is confined within gland 33 and serves to seal the bearing surfaces 15 and 20, defined between the journal 12 and the cone 16, during the ring lapping process. The O-ring 37 may be fabricated from the preferred nitrile compound as heretofore mentioned or it may be fabricated from a resilient material, such as silicon rubber or plastic, having a specific Shore durometer hardness dependent upon the desired rate at which ring 32 seats against radially disposed wall 24 of cone 16. A controlled rate of O-ring deterioration is a major means to reliably seat metal-to-metal surfaces to assure a good seal after the lapping process is completed. Moreover, O-ring 37 may be larger or smaller in cross-sectional diameter to control the "break-in" period of the metal-to-metal seal. The resilient portion 34 of the seal is shaped in a mold to be slightly compressed within seal cavity 22. The seal cavity 22 is defined by the axially aligned cavity wall 27, radially aligned bearing surface 24, journal bearing surface 15 and the leg backface 14.

Lubricant is provided to bearing surfaces 15 and 20 from a lube reservoir in the bit body (not shown) through lube access channel 39 in leg 10. The lubricant intersects and is directed through ball hole 41 in the leg 10 and journal 12. The ball hole is plugged by ball plug 43 after the cone retention balls are in place.

Figure 2:
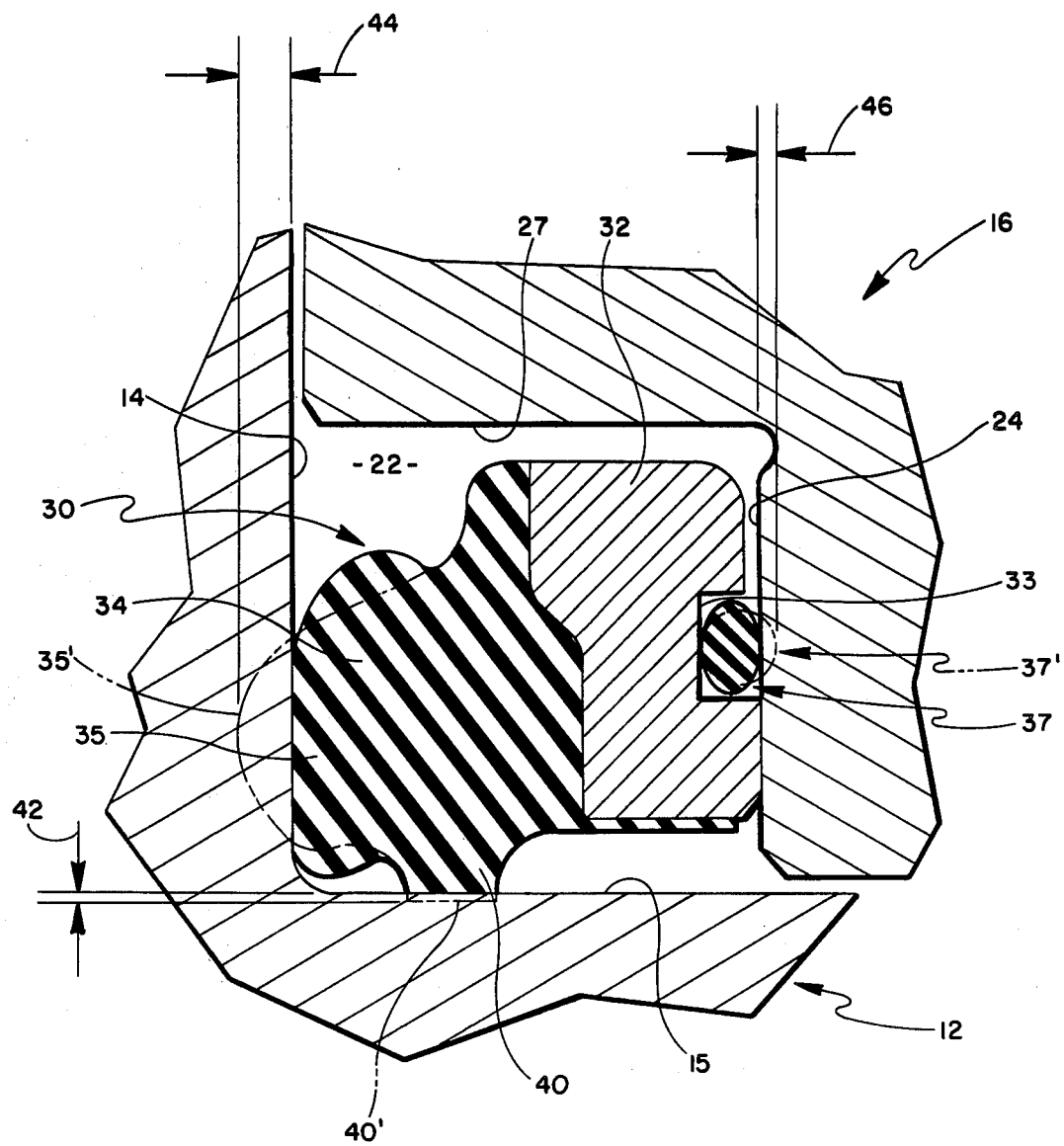
FIG. 2 is a view taken through 2—2 of FIG. 1 illustrating an enlarged cross section of the seal entrapped within a sealing cavity.

With reference now to FIG. 2, the portion of the seal 35 of the resilient material 34, contacting the leg backface 14, is semicircular in shape and acts like an O-ring when compressed against backface 14. An inner portion 40 of resilient material 34 contacts the journal bearing surface 15 and is also under compression. O-ring 37 in gland 33 is positioned radially outwardly from peripheral lip 38. The O-ring and gland are outwardly of and concentric with the metal peripheral lip 38 of ring 32. The O-ring protruding from the ring 32 is compressed against the radially machined recessed surface 24 in cone 16. Since the composite seal 30 is compressed within the seal cavity 22, the seal initially acts as a conventional O-ring seal. The resilient portion of the seal is compressed at seal portions 35 and 40 and the separate O-ring 37 is compressed between ring 32 and radial wall 24 of cone 16. The amount of compression is indicated by distances 44, 46 and 42. The composite seal 30, in its uncompressed state, is indicated in phantom at 35' and 40'; the separate O-ring 37 is shown in its uncompressed state at 37'.

During operation of the rock bit, the composite seal acts as an O-ring with the small O-ring 37 confined within seal gland 33, providing the initial primary seal while the metal peripheral surface 38 laps itself into sealing engagement with the radially machined adjacent metal surface 24. Continued operation of the rock bit in a borehole will gradually wear away or abrade the O-ring seal 37 as the metal-to-metal seal becomes more effective. Hence, lubricant from within the bit cannot escape past the O-ring 37 while the unlapped metal-to-metal surfaces 24 and 38 work themselves into lapped seal engagement with one another during initial operation of the bit.

It is obvious then that an expensive and time-consuming seal ring lapping operation is substantially eliminated during the fabrication of a sealed bearing rock bit, the lapping operation taking place while the bit works in a borehole.

The preferred metal material of ring 32 is a low carbon steel, such as 1018 steel, with a hard metal spray coating, such as Chromium Oxide Silica Metco 136SF. This hard metal spray coat is about ten-thousandths of an inch thick. Other suitable hard metal spray coating would be Tungsten Carbide Metco 73-FNS-1 or Aluminum Oxide-Titanium Dioxide Metco 130SF.

The ring 32 may be fabricated from Carbon Graphite P-658RC or Silicon Carbide PE-8148 without departing from the teachings of this invention.

It would be obvious to provide the self-lapping seal for any bearing assembly where retention of internal lubricant is essential during the self-lapping process.

It would be obvious to fabricate the ring in slightly different configurations to accommodate different sizes and shapes of seal cavities.

It would also be obvious to utilize an axially aligned surface as a lapping surface for the metal-to-metal seal contact.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

I claim:

1. A seal apparatus for a rotary cone rock bit, said seal being positioned in a cavity formed between a journal extending from a leg of said rock bit and a rotatable cone mounted on said journal, said seal comprising:

a metal ring, said ring having a diameter that will fit within said cavity, a peripheral surface formed by said ring subsequently serving as part of a metal-to-metal seal, an annular seal gland channel formed by said metal ring, said channel being positioned adjacent said peripheral surface, a resilient material partially encapsulating said metal ring, said resilient material forming an O-ring type of seal in said cavity formed between said leg of said rock bit and said rotatable cone, a separate seal packing ring contained within said seal gland channel in said metal ring, during initial rotation of said cone on said journal, a portion of said separate seal packing ring adjacent said metal peripheral surface eventually wears away exposing said peripheral metal surface to an adjacent cavity wall, said metal surface and said cavity wall subsequently forming a lapped sealing surface, said separate seal packing ring prevents loss of a lubricant stored within said rock bit during the time said peripheral surface of said metal ring is forming a lapped seal against said adjacent wall of said cavity.

2. The invention as set forth in claim 1 wherein the seal cavity is formed in the cone of said rock bit.

3. The invention as set forth in claim 2 wherein said wall of said cavity in said cone forming part of said metal-to-metal lapped seal is a radially extending metal surface.

4. The invention as set forth in claim 3 wherein said metal ring forming said peripheral surface is positioned with its peripheral surface adjacent to said radially extending wall of said cavity.

5. The invention as set forth in claim 1 wherein the combination of said resilient material encapsulating said metal ring and said separate seal packing ring contained within said channel formed in said metal ring are formed slightly larger than said cavity, said resilient material and said seal packing ring being slightly deformed under compression when inserted within said cavity.

6. The invention as set forth in claim 1 wherein said resilient material encapsulating said metal ring is a nitrile compound.

7. The invention as set forth in claim 1 wherein said seal packing ring is fabricated from a nitrile compound.

8. The invention as set forth in claim 1 wherein said seal packing ring is a resilient O-ring.

9. The invention as set forth in claim 1 wherein said metal ring is fabricated from a low carbon steel.

10. A method wherein a metal-to-metal seal is self-lapping, said seal being so configured to fit within a seal cavity formed by a bearing assembly, said seal retains lubricant surrounding bearing surfaces within said bearing assembly during the self-lapping process comprising the steps of:

encapsulating partially an annular metal ring within a resilient material, a peripheral surface formed by said ring subsequently serving as part of said self-lapping metal-to-metal seal, inserting a separate seal packing ring into a seal gland channel formed in said metal ring adjacent and peripheral surface, inserting said self-lapping seal within said seal cavity, a cross section of said seal including said separate packing ring contained within said channel being larger than a cross section of said seal cavity formed by said bearing assembly, said seal being under compression when inserted within said seal cavity, said separate seal packing ring adjacent to said peripheral surface of said metal ring is positioned concentric with and outside of said peripheral surface, said separate seal packing ring prevents egress of lubricant from said bearing surfaces while said peripheral surface of said ring laps itself against an adjacent wall of said seal cavity, and abrading away gradually of said separate seal packing ring adjacent said metal peripheral surface as the metal-to-metal surfaces lap themselves into sealing engagement, one with the other, thereby providing a resilient seal prior to a lapped metal-to-metal seal during operation of said bearing assembly.

11. The method as set forth in claim 10 further comprising the step of inserting said self-lapping seal within a rock bit.

12. The method as set forth in claim 11 further comprising the steps of:

forming a seal cavity in a cone of said rock bit, said seal cavity being substantially closed when said cone is mounted on a journal extending from a leg of said rock bit, inserting said seal under compression into said seal cavity prior to mounting said cone onto said journal, and abrading a portion of said seal packing ring inserted within said channel formed in said metal ring, said separate seal packing ring being concentric with and surrounding said peripheral metal surface of said ring as said peripheral surface laps itself into sealing engagement with an adjacent surface defining said seal cavity thus substantially eliminating egress of a lubricant from within said rock bit during the self-lapping process.

* * * * *